United States Patent [19]

Marshall et al.

[11] Patent Number: 5,503,891
[45] Date of Patent: Apr. 2, 1996

[54] FLEXIBLE MAGNET ATTRACTANT DISPLAY MAT

[75] Inventors: Clarence D. Marshall, Mount Royal; Robert A. Marshall, Unionville, both of Canada

[73] Assignee: Marflex International Inc., Markham, Canada

[21] Appl. No.: 328,364

[22] Filed: Oct. 25, 1994

[51] Int. Cl.⁶ ................................... B32B 3/26
[52] U.S. Cl. .................. 428/99; 40/600; 428/323; 428/425.9; 428/428; 428/522; 428/523; 428/900
[58] Field of Search ................ 428/99, 323, 425.9, 428/482, 522, 523, 900, 694 B; 40/600; 434/430, 429, 425, 281

[56] References Cited

U.S. PATENT DOCUMENTS

| | | | |
|---|---|---|---|
| 3,093,919 | 6/1963 | Holtzl | 40/621 |
| 3,102,314 | 9/1963 | Alderfer | 24/303 |
| 3,464,134 | 9/1969 | Franklin | 40/621 |
| 3,515,625 | 6/1970 | Sedlak | 428/900 |
| 3,549,463 | 12/1970 | Frech | 428/168 |
| 3,654,711 | 4/1972 | Taylor | 434/425 |
| 3,716,935 | 2/1973 | Friederichs | 40/621 |
| 3,726,026 | 4/1973 | Borcherding | 434/430 |
| 3,755,938 | 9/1973 | Bytwork | 40/530 |
| 3,839,130 | 10/1974 | Dean et al. | 428/43 |
| 4,427,481 | 1/1984 | Smith et al. | 156/306.6 |
| 4,584,223 | 4/1986 | Krapf | 428/58 |
| 4,996,110 | 2/1991 | Tanuma et al. | 428/343 |
| 5,016,888 | 5/1991 | Huston et al. | 273/239 |
| 5,131,849 | 7/1992 | Perrero | 434/281 |
| 5,263,866 | 11/1993 | Campbell | 434/416 |
| 5,356,717 | 10/1994 | Choki | 428/425.9 |

FOREIGN PATENT DOCUMENTS 0372758  8/1990  European Pat. Off. .

*Primary Examiner*—Nasser Ahmad
*Attorney, Agent, or Firm*—Oldham & Oldham Co.

[57] ABSTRACT

The present invention relates to a display mat for receiving magnetic display symbols, wherein said display mat is flexible and magnet attractant.

11 Claims, 1 Drawing Sheet

FLEXIBLE MAGNET ATTRACTANT DISPLAY MAT

BACKGROUND OF THE INVENTION

Prior to about 1980 wallboards were predominantly non-magnetic, for example, corkboards, chalkboards and the like. The introduction of what are commercially referred to as "whiteboards" in the 1980's led to the development of: (a) melamine surfaced boards, which accepted wet or dry markers, and which thus have a write-on/wipe-off capability; and (b) porcelain (or similar material) on steel boards which accept magnetic strips, markers, icons and the like. The primary disadvantage of the present whiteboards, especially the magnet attractant variety, is that they are expensive to manufacture and can be difficult to transport. The transportation difficulties are two fold, the boards are often large and rigid and cannot be reduced to a convenient size and they are heavy due to the materials presently used in their construction. Furthermore, because of their size and weight conventional boards a prone to damage during shipment. While hinged folding boards are known, they do not fully overcome the aforementioned problems.

Additionally, conventional boards need to be installed onto the walls where they are to be used by drilling holes into the wall (often this is prohibited in premises that are leased) and large boards need to be installed by crews of several persons due to their weight and size.

The present invention has significant advantages over the prior art. Unlike the traditional rigid boards, a magnet attractant wall display mat according to the present invention is significantly lower in weight (about on 25% of the weight of the prior art magnetic boards) and is sufficiently flexible that it can be easily rolled and inserted into a tube for transport (occupying only about 30% of the cubic capacity of the prior art magnetic boards).

There are many potential uses for the magnet attractant mats of the present invention which include, but are not limited to, its use as a presentation board, as a grid-or chart-board, as an organizer-scheduler, as an "in/out" board, as a calendar and as a projection screen. Additionally, it may also be used as a replacement "skin" for prior art bulletin boards such as chalkboards and the like.

SUMMARY OF THE INVENTION

The invention herein comprises a display mat for receiving magnetic symbols, wherein said display mat is flexible and magnet attractant.

The invention also comprises a flexible display mat for receiving magnetized symbols, comprising a magnet attractant display surface consisting of a copolymeric binder of between 4 to 40% ethylene-vinyl-acetate and 60 to 90% iron powder filler and a display surface overlay of polyvinyl chloride.

BRIEF DESCRIPTION OF THE DRAWINGS

The following is a description, by way of example, of a preferred embodiment of the present invention, reference being had to the accompanying drawings in which.

While the invention will be described in conjunction with the illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
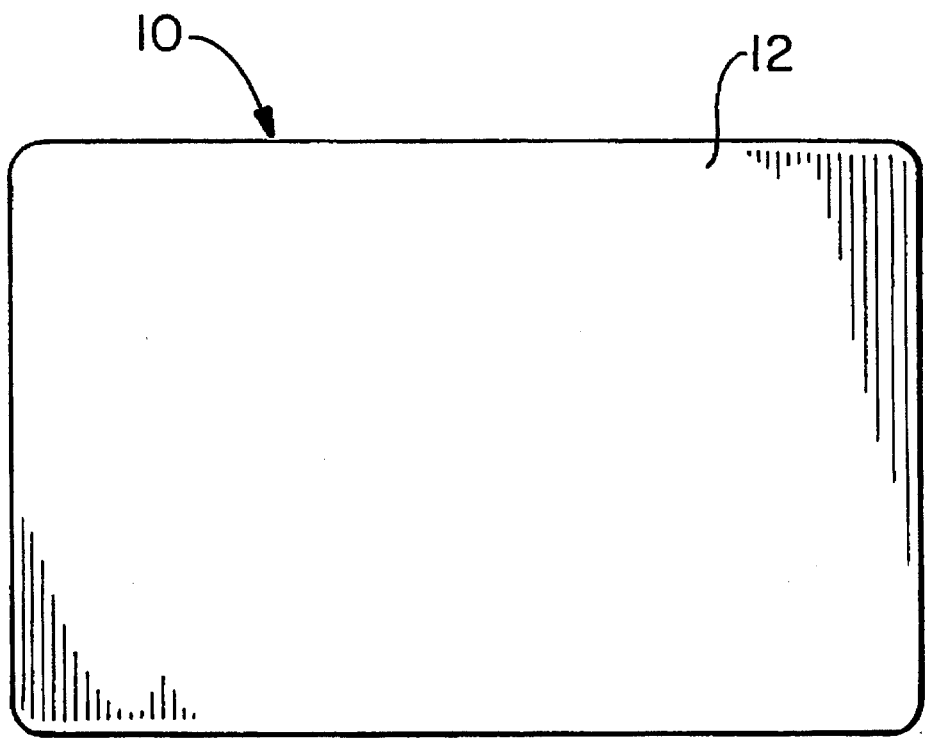
FIG. 1 is a front view of one embodiment.

In the drawings, similar features have been given similar reference numerals. Turning to FIG. 1 a display mat 10 is illustrated having a display surface 12 and a magnet attractant substrate 14.

The magnet attractant substrate is a ferrous/ferrite filled polymer sheet preferably between 0.25 to 0.75 mm in thickness. The substrate consists of between 4 to 40% of a polymeric binder, preferably a low melting point binder such as ethylene-vinyl-acetate, and between 60 to 96% iron powder filler in the form of atomized spherically shaped particles. Preferably it consists of 10% ethylene-vinyl-acetate, 88% iron powder filler, with the balance of the composition consisting of stabilizers and processing aids, and is manufactured by cast extrusion. One such suitable material is manufactured by the Dupont company and is described in their published Canadian Patent Application No. 2,003,879 of Nov. 24, 1989. Other suitable binder materials for the substrate comprise low modulus ethylene copolymers selected from the group consisting of ethylene-methyl-acrylate, ethylene-ethyl-acrylate, ethylenemethacrylic acid and ethylene-butyl-acrylate and maleic anhydride grafts thereof. Also suitable are polyvinylchloride, ethylene propylene synthetic rubbers and ethylene propylene elastomer with a reactive monomer graft, as well as a group consisting of a copolymer of ethylene and methacrylic acid and a copolymer of ethylene and ethylene acrylic acid. A further suitable group will be a variety of thermoplastics including specifically polypropylene, polyethylene, polycarbonate, polystyrene, acrylonitrile-butadiene-styrene terpolymer, polyphenyleneoxidepolystyrene blends, acrylic polymer, polyurethane and polyamides.

Figure 2:
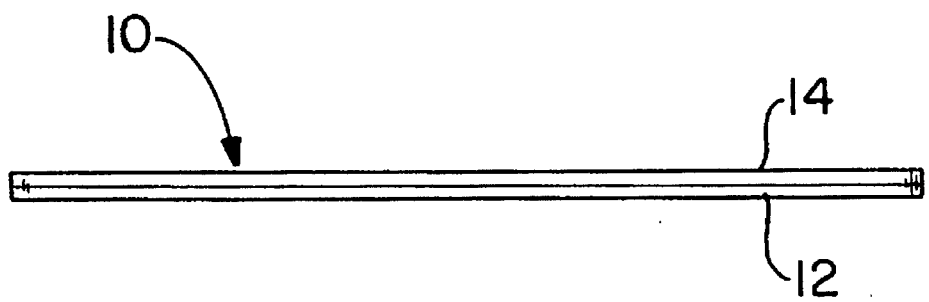
FIG. 2 is a top plan view of this embodiment.

The display surface is composed of an extrusion laminate of semi-rigid plastics, such as polyvinylchloride, and the sheet is preferably 0.175 to 0.750 mm in thickness. The display surface may be plain white, and as such can receive wet or dry markers, can be provided with an overlaid graphed or charted surface, for example by silk-screening, to facilitate the presentation of information with the application of magnetic symbols and information, or indeed, could have a printed chalk compatible surface for use with chalk. Other uses include a matt surface applied over the polyvinylchloride to produce a flexible, portable projection screen. As seen in FIG. 2 the display surface is attached over the substrate as an overlay and secured thereon by adhesive. One method of adhering the display surface on to the substrate is to mechanically laminate it using a 50 micron dry mount acid-free adhesive film. The film melts upon heating and as such the display surface, adhesive film and substrate are heated together and then pressed using a hydraulic press, or rollers. Other methods of adhering the display surface to the substrate include use of a curing adhesive or a thermoplastic adhesive, all of which may be sprayed or applied from a roll of film.

In combination the overlay and substrate can be rolled while maintaining its original shape as a flat sheet upon unrolling. The sheet may be laid out flat on a table top or fastened to a wall or easel in any conventional manner. It can easily be attached to a wall using magnetic strips which are first fastened to a wall and the mat is then placed over these magnetic strips where it is held in place due to its magnet attractant capability.

While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A filled and flexible magnet attractant display mat for attracting and retaining permanently magnetic symbols, said display mat comprising a magnet attractant substrate formed of a ferrous/ferrite powder filler, uniformly dispersed throughout a polymeric binder such that said powder filler comprises 60 to 96 percent by weight of said substrate, said powder filler comprises atomized spherically shaped particles and wherein said substrate is rollable for storage and transport, said magnet attractant substrate is in the range of approximately 0.250 to 0.750 mm thickness, and said mat further comprising a display surface composed of polyvinyl chloride overlying and adhesively bonded to said substrate.

2. A highly filled and flexible magnet attractant display mat as recited in claim 1, wherein said powder filler comprises at least 85 percent by weight of said display mat.

3. A highly filled and flexible magnet attractant display mat as recited in claim 2 comprising approximately 10 percent by weight ethylene-vinyl-acetate, and approximately 88 percent by weight powder filler.

4. A highly filled and flexible magnet attractant display mat as recited in claim 1, wherein said polymeric binder is a low melting point copolymer selected from the group consisting of ethylene-vinyl-acetate, ethylene-methyl-acrylate, ethylene-ethyl-acrylate, ethylene-butyl-acrylate, and ethylene-methacrylicacid.

5. A highly filled and flexible magnet attractant display mat as recited in claim 2, wherein said polymeric binder is a low melting point copolymer selected from the group consisting of ethylene-vinyl-acetate, ethylene-methyl-acrylate, ethylene-ethyl-acrylate, ethylene-butyl-acrylate, and ethylene-methacrylicacid.

6. A highly filled and flexible magnet attractant display mat as recited in claim 1, wherein said overlying display surface is composed of an extrusion laminate of semi-rigid plastics.

7. A highly filled and flexible magnet attractant display mat as recited in claim 1, wherein the overlying display surface is a sheet of polyvinylchloride having a thickness in the range of 0.175 mm to 0.750 mm.

8. A highly filled and flexible magnet attractant display mat as recited in claim 1, wherein said overlying display surface is adhesively bonded to said display mat using a 50 micron dry mount acid-free adhesive film.

9. A highly filled and flexible magnet attractant display mat as recited in claim 1, wherein said overlying display surface is adhesively bonded to said display mat using a curing adhesive.

10. A highly filled and flexible magnet attractant display mat as recited in claim 1, wherein said overlying display surface is adhesively bonded to said display mat using a thermoplastic adhesive.

11. A highly filled and flexible magnet attractant display mat as recited in claim 1, wherein said overlying display surface is either transparent, colored, or white.

* * * * *